United States Patent
Kittaka et al.

(10) Patent No.: US 6,419,066 B1
(45) Date of Patent: Jul. 16, 2002

(54) ELECTROMAGNETIC COUPLING APPARATUS

(75) Inventors: Yoshiaki Kittaka; Hiroshi Tanaka, both of Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 11 days.

(21) Appl. No.: 09/613,307

(22) Filed: Jul. 10, 2000

(30) Foreign Application Priority Data

Nov. 10, 1999 (JP) ............................. 11-319404

(51) Int. Cl.[7] ............................. F16D 27/108
(52) U.S. Cl. ................. 192/84.961; 192/84.96
(58) Field of Search .............. 192/84.96, 84.961; 335/281, 296

(56) References Cited

U.S. PATENT DOCUMENTS

| | | | | |
|---|---|---|---|---|
| 4,810,985 A | * | 3/1989 | Mesenich | 335/281 X |
| 5,148,902 A | * | 9/1992 | Nakamura | 192/84.961 |
| 5,909,787 A | * | 6/1999 | Kubo | 192/84.96 |

FOREIGN PATENT DOCUMENTS

| | | | |
|---|---|---|---|
| EP | 0 313 680 | * | 5/1989 |
| JP | 52-26294 | | 7/1977 |
| JP | 57-23815 | | 5/1982 |
| JP | 2000-329163 | * | 11/2000 |

\* cited by examiner

Primary Examiner—Rodney H. Bonick
(74) Attorney, Agent, or Firm—Sughrue Mion, PLLC

(57) ABSTRACT

To provide an electromagnetic coupling apparatus that is low in manufacture cost and superior in durability with high performance, the electromagnetic coupling apparatus including: a first rotary member constituting a magnetic circuit; a magnetically exciting coil provided to be relatively rotatable inside of the first rotary member; a yoke provided to be rotatable relative to the first rotary member for constituting a part of the magnetic circuit of said first rotary member; and a second rotary member provided to face the first rotary member in the axial direction and having a movable member provided to be movable in the axial direction for constituting a part of the magnetic circuit. The yoke is formed by laminating thin plates in the axial direction.

15 Claims, 4 Drawing Sheets

ELECTROMAGNETIC COUPLING APPARATUS

BACKGROUND OF THE INVENTION

1. Field of the Invention

The present invention relates to an electromagnetic coupling apparatus for intermittently transmitting a rotational torque by utilizing an electromagnetic force, and more particularly to, for example, an electromagnetic coupling apparatus provided with a first rotary member for forming a magnetic circuit, a magnetically exciting coil provided rotatably relatively inside of the first rotary member, a yoke provided rotatably relatively to the first rotary member for constituting a part of the magnetic circuit of the first rotary member, and a second rotary member provided to face the first rotary member in an axial direction and having a movable member and provided to be movable in the axial direction for constituting a part of the magnetic circuit.

2. Description of the Related Art

A conventional electromagnetic coupling apparatus will now be described.

In a paper feed mechanism for a copying machine, a facsimile or the like, a paper feed roller is rotated from a predetermined rotational position by a predetermined angle, for example, one turn to feed a piece of recording paper into an interior of the apparatus. The electromagnetic coupling apparatus for performing engagement operation and interruption operation of a clutch is applied in accordance with a control of electric supply to electromagnets as a drive apparatus of a paper feed roller shaft in the paper feed mechanism.

FIG. 6 is a fragmentary side elevational view showing one example of such an electromagnetic coupling apparatus.

In FIG. 6, reference numeral 1 denotes the first rotary member. This rotary member is in the form of a ring for forming the magnetic circuit having a U-shape in cross section and is composed of a cup-shaped rotor 3 and a first shaft 2 made of oil impregnated sintered alloy into which a suitable amount of oil is impregnated.

Reference numeral 4 designates the magnetically exciting coil. This magnetically exciting coil 4 is an annular coil that is disposed inside of the first rotary member 1, i.e., between the first shaft 2 and the rotor 3 to be movable relative to the first rotary member 1 and wound around a bobbin 12 that is a winding frame.

A yoke 5 is disposed on the opening end side of the first rotary member 1, i.e., on the open side of the gap between the first shaft 2 and the rotor 3 to form a part of the magnetic circuit, mounted to be slidable, i.e., movable in the axial direction and rotatable relative to the first shaft 2 and made of oil impregnated sintered alloy into which a suitable mount of oil is impregnated.

A second rotary member 6 is disposed to face the first rotary member 1 in the axial direction, fixed to a gear portion 7 through a leaf spring 8 to form a part of the magnetic circuit and composed of a movable member 9 that is movable in the axial direction.

A second shaft 10 is made of oil impregnated sintered alloy into which a suitable amount of oil is impregnated, clamps the rotor 3 in cooperation with the first shaft 2. The first shaft 2 and the second shaft 10 are formed into one piece by press-fitting or by invasion of a projection (not shown).

A rotation preventing projection 5a that forms a rotation preventing means relative to the first rotary member 1 is provided at a part of the yoke 5 and is connected to or engaged with an outside stationary portion (not shown) so that the yoke 5 and the magnetically exciting coil 4 are prevented from rotating together with the first shaft 2.

Also, the movable member 9 is positioned to have a gap G between the movable member 9 and the side surface of the rotor 3 in the case where one end of the gear portion 7 is brought into contact with a side surface of the rotor 3.

A plurality of windows (not shown) are formed in the side wall portion that serves as a frictional surface with the rotor 3 to increase the magnetic resistance to decrease a part passing through the side wall portion from an inner diameter side to an outer diameter side of the rotor 3 and to increase a part passing through the movable member 9 out of the magnetic flux Φ to be described later.

Also, the above-described first shaft 2, second shaft 10 and yoke 5 are formed of the oil impregnated sintered alloy into which the oil is impregnated in order to form the magnetic circuit and the rotor 3 and the movable member 9 are made of magnetic material, for example, iron plates.

The operation of this electromagnetic coupling apparatus will now be described.

When the rotational torque of the drive shaft (not shown) is transmitted to the second rotary member 6 through the gear portion 7, the second rotary member 6 inclusive of the movable member 9 is rotated around the second shaft 10.

Subsequently, when the current is caused to flow through the magnetically exciting coil 4 as the magnetically exciting means to magnetically excite the coil, the magnetic flux Φ passing through the first shaft 2, the side wall portion of the rotor 3, the movable member 9, the cylindrical portion of the rotor 3 and the yoke 5 is generated to form the magnetic circuit.

The movable member 9 is attracted to the side wall portion of the rotor 3 against the spring force of the leaf spring 8 by the thus generated magnetic force. The rotational torque is transmitted between side surfaces of the movable member 9 and the side wall portion of the rotor 3 by the force that is determined by the attractive force and the frictional coefficient between the movable member 9 and the rotor 3.

Accordingly, the rotational torque given to the second rotary member 6 is transmitted to the first shaft 2 through the leaf spring 8, the movable member 9 and the rotor 3 so that the load shaft of the load device (not shown) engaged with the first shaft 2 is drivingly rotated.

On the other hand, when the electric supply to the magnetically exciting coil 4 is interrupted, the electromagnetic force is eliminated and the movable member 9 is separated away from the rotor 3 by the restoration force of the leaf spring 8. As a result, the rotational torque of the second rotary member 6 is not transmitted to the first shaft 2 and is not transmitted to the load shaft (not shown). Thereafter, the load device (not shown) is naturally stopped by, for example, a mechanical frictional force or the like.

As described above, in the conventional electromagnetic coupling apparatus, the first shaft 2 and the yoke 5 are made of oil impregnated sintered alloy into which the suitable amount of oil is impregnated. For this reason, there is a limit to durability (anti-sliding property). There is a problem that a disadvantage of sticking or the like is generated due to the degradation of the oil or the shortage of the oil, resulting in locking or that the inertia rotation of the load is remarkable, or that the amount of wear of the sliding portions is increased.

Also, the yoke 5 made of the oil impregnated sintered alloy tends to be magnetically balanced with rotor 3 to be attracted toward the rotor 3 and to be subjected to a thrust load. The magnetic exciting coil 4 is pushed toward the side wall portion of the rotor 3 so that the bobbin 12 that is the winding frame of the magnetically exciting coil 4 is frictionally moved on and along the side wall portion of the rotor 3 to increase the frictional wear amount of the end face of the bobbin 12. Furthermore, there is a problem that a stick slip is generated between the side surfaces of the bobbin 12 and the rotor 3 by the frictional wear powder so that the bobbin is resonant and generates abnormal noise.

Also, when the yoke 5 tilts when the yoke S is attracted toward the rotor 3, the sliding portion thereof with the first shaft 2 is abnormally worn.

Also, since the first shaft 2, the second shaft 10 and the yoke 5 are made of oil impregnated sintered material, these components are porous. Due to the existence of these pores, the density is lowered and the magnetic resistance is increased. As a result, it is difficult to obtain the static frictional torque. In particular, since it is necessary to impregnate the yoke 5 with a suitable amount of oil in order to maintain the oil content, it is impossible to increase the density.

Also, in order to improve the sliding property, it is necessary to add copper (Cu). However, for this reason, it is impossible to improve the magnetic characteristics and it is difficult to increase the torque.

In addition, since it is difficult to increase the static frictional torque, it is necessary to reduce the clearance of the adjacent components to decrease the magnetic resistance. For this reason, there is a problem that the magnetic shielding property is further degraded. If the magnetic shielding property becomes worse, the paper is fed too much, which leads to the paper jam.

Also, if the projection portion is provided outside of the first rotary member 1 as the rotation preventing means for the yoke 5 to the first rotary member 1, the length thereof is elongated because the rotary member is made of sintered alloy.

Also, in case of oil impregnated sintered material, its manufacture process is complicated and costly.

With respect to the yoke 5, Japanese Examined Patent Publication No. Sho 52-26294 and Japanese Examined Patent Publication No. Sho 57-23815 disclose a yoke (iron core) that is not made of oil impregnated sintered material but formed of laminated thin plates in the circumferential direction.

However, in these cases, since after the respective thin plates are aligned uniformly, the resin is caused to flow in between the thin plates, there is a serious problem that the magnetic characteristics become worse.

If, in order to improve the magnetic characteristics, the resin containing the magnetic powder is used, there is a problem that the manufacture cost is considerably increased.

SUMMARY OF THE INVENTION

In order to overcome the above noted various problems, an object of the present invention is to provide an electromagnetic coupling apparatus that is superior in durability with a high performance.

According to a first aspect of the present invention, there is provided an electromagnetic coupling apparatus comprising: a first rotary member constituting a magnetic circuit; a magnetically exciting coil provided to be relatively rotatable inside of the first rotary member; a yoke provided to be rotatable relative to the first rotary member for constituting a part of the magnetic circuit of the first rotary member; and a second rotary member provided to face the first rotary member in the axial direction and having a movable member provided to be movable in the axial direction for constituting a part of the magnetic circuit, wherein the yoke is formed by laminating thin plates in the axial direction.

According to a second aspect of the present invention, there is provided an electromagnetic coupling apparatus comprising: a first annular rotary member constituting a magnetic circuit having a U-shape in cross section; a magnetically exciting annular coil provided to be relatively rotatable inside of the first rotary member; an annular yoke disposed on an opening end side of the first rotary member, provided to be rotatable relative to the first rotary member for constituting a part of the magnetic circuit of the first rotary member; and a second rotary member provided to face the first rotary member in the axial direction and having a movable member provided to be movable in the axial direction for constituting a part of the magnetic circuit, wherein the yoke is formed by laminating annular thin plates in the axial direction.

According to a third aspect of the present invention, in the electromagnetic coupling apparatus according to the first or the second aspect of the present invention, a resin bush is provided between the yoke and the first rotary member.

According to a fourth aspect of the present invention, in the electromagnetic coupling apparatus according to the third aspect of the present invention, the resin bush and a winding frame of the magnetically exciting coil are formed integrally with each other.

According to a fifth aspect of the present invention, in the electromagnetic coupling apparatus according to the third or the fourth aspect of the present invention, the resin bush is fixed to the yoke.

According to a sixth aspect of the present invention, in the electromagnetic coupling apparatus according to the fifth aspect of the present invention, an engagement convex portion is provided on an outer diameter side of the resin bush and an engagement concave portion engaged with the engagement convex portion is provided on an inner diameter side of the yoke.

According to a seventh aspect of the present invention, in the electromagnetic coupling apparatus according to the sixth aspect of the present invention, the engagement convex portion is a rib formed on the outer diameter side of the resin bush and the engagement concave portion is a cutaway engaged with the rib of the resin bush and provided on the inner diameter side of the yoke.

According to an eighth aspect of the present invention, in the electromagnetic coupling apparatus according to the seventh aspect of the present invention, the rib of the resin bush is thermally deformed at the cutaway portion of the yoke opposite the magnetically exciting coil to fix the yoke and the resin bush together, and the yoke and the magnetically exciting winding frame are formed integrally with each other through the resin bush.

According to a ninth aspect of the present invention, in the electromagnetic coupling apparatus according to the second aspect of the present invention, a diameter of the outer diameter portion that does not face the outer circumferential portion of the first rotary member is smaller than a diameter of the outer diameter portion of the yoke that faces outer circumferential portion of the first rotary member.

According to a tenth aspect of the present invention in the electromagnetic coupling apparatus according to the second aspect of the present invention, a part of the outermost thin plate of the yoke opposite the magnetically exciting coil is caused to extend radially outwardly to serve as a rotation preventing member for the first rotary member.

According to an eleventh aspect of the present invention, in the electromagnetic coupling apparatus according to the first or the second aspect of the present invention, corrugations of adjacent thin plates where the corrugations are provided and engaged with each other.

According to a twelfth aspect of the present invention, in the electromagnetic coupling apparatus according to the first or the second aspect of the present invention, a surface process for enhancing anti-wear proof and sliding property is applied to a sliding portion of the yoke.

According to a thirteenth aspect of the present invention, in the electromagnetic coupling apparatus according to the first or the second aspect of the present invention, holes of a predetermined form and arrangement are provided in each thin plate, and the form and the arrangement of the holes are of at least two patterns.

According to a fourteenth aspect of the present invention, in the electromagnetic coupling apparatus according to the first or the second aspect of the present invention, the thin plate to be laminated to the portion that does not face the outer circumferential portion of the first rotary member having a U-shape in cross section is made of non-magnetic material.

According to a fifteenth aspect of the present invention, in the electromagnetic coupling apparatus according to the tenth aspect of the present invention, the rotational preventing member for the first rotary member is formed by bending the thin plate toward the outside of the first rotary member having a U-shape in cross section.

According to a sixteenth aspect of the present invention, in the electromagnetic coupling apparatus according to the first or the second aspect of the present invention, a cutaway is formed in the inner circumferential side of the yoke and lubricant is filled in the cutaway.

DETAILED DESCRIPTION OF THE PREFERRED EMBODIMENTS

Embodiment 1

Figure 1:
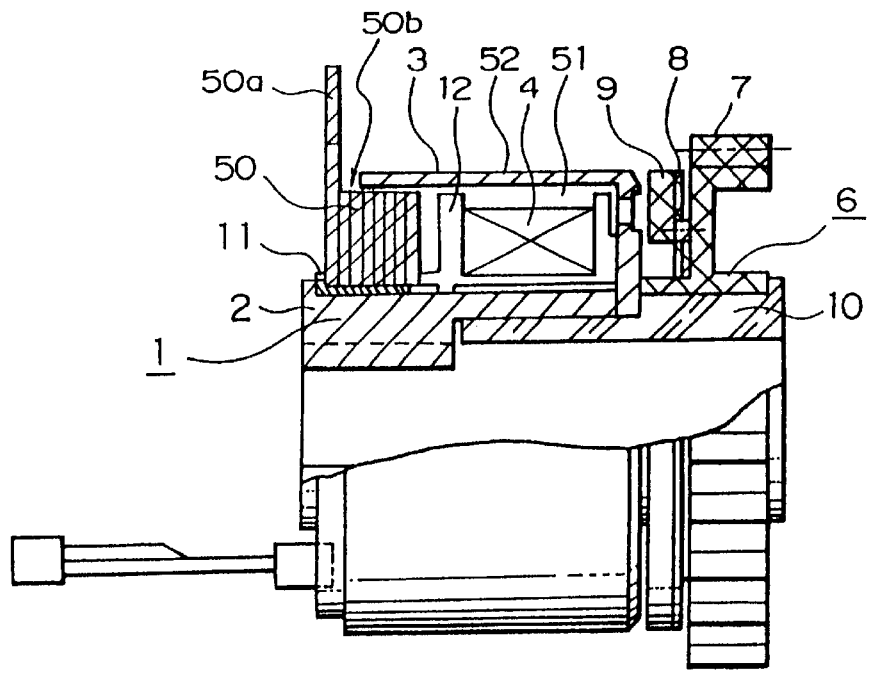
FIG. 1 is a fragmentary side elevational view showing an electromagnetic coupling apparatus in accordance with a first embodiment of the invention.
Figure 6:
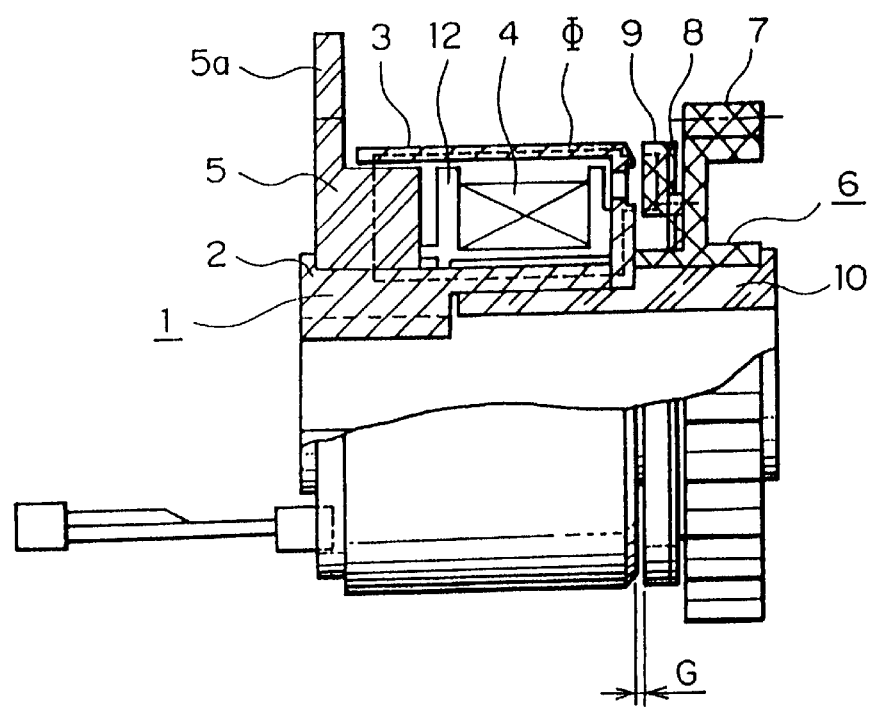
FIG. 6 is a fragmentary side elevational view showing a conventional electromagnetic coupling apparatus.

An electromagnetic coupling apparatus according to a first embodiment of the present invention will now be described with reference to FIG. 1. FIG. 1 is a fragmentary side elevational view showing the electromagnetic coupling apparatus according to the first embodiment of the invention. Incidentally, the same reference numerals are used to indicate the same or like components of the conventional electromagnetic coupling apparatus shown in FIG. 6 and the explanation therefor will be omitted.

The electromagnetic coupling apparatus according to the first embodiment is provided with an annular first rotary member 1 for forming a magnetic circuit having a U-shape in cross section, a magnetically exciting annular coil 4 provided to a space 51 surrounded by an inner side, i.e., a U-shape cross-section of the first rotary member 1 to be rotatable relative to the first rotary member 1, an annular yoke 50 disposed on an opening end side (on the left side of FIG. 1) of the space 51 of the above-described first rotary member 1 and provided rotatably relative to the first rotary member 1 to form a part of the above-described magnetic circuit, and a second rotary member 6 disposed to face the above-described rotary member 1 in the axial direction to form a part of the above-described magnetic circuit and having a movable member 9 provided movably in the axial direction. The above-described yoke 50 is formed of laminated annular thin plates in the axial direction.

As shown in FIG. 1, the above-described yoke 50 is formed by laminating, in the axial direction, a suitable number of thin plates (steel plates) formed in an annular shape that may engage with the first shaft 2.

Figure 8:
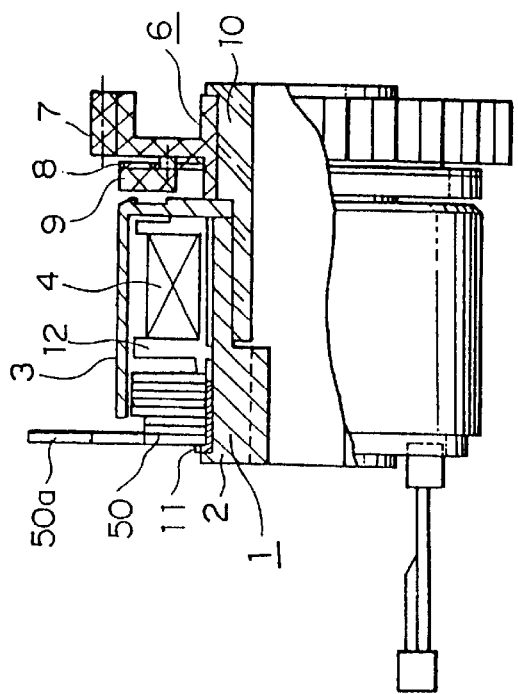
FIG. 8 is a fragmentary side elevational view showing another modified electromagnetic coupling apparatus in accordance with a first embodiment of the invention.

In the case where the yoke 50 takes a structure in which thin plates are laminated on one another, a corrugation (see FIG. 8) is applied to each thin plate to be laminated and the adjacent thin plates are engaged with each other to stabilize the fixture. In the case where such a corrugation is applied, for example, only holes are formed in the final one thin plate on the convex side so that it is possible to take a structure where no convex portion is formed at the end face of the yoke 5. Of course, it is possible to form the structure by fixture means such as adhesion or welding instead of the engagement of the convex and concave portions in combination.

As described above, if the corrugation is applied to each thin plate to be laminated and the thin plates are engaged with and fixed to each other for the yoke 50, since the thin plates are laminated in the axial direction of the first shaft 2, it is possible to simplify the manufacture process and to enhance the productivity to considerably reduce the manufacture cost.

Also, since it is possible to form the yoke 50 by using the thin plates, for example, steel plates unlike the conventional case in which the oil impregnated sintered alloy having the pores that cause the magnetic resistance to be increased, it is possible to increase the density of the yoke 50 to considerably enhance the magnetic characteristics. Accordingly, it is possible to increase the torque to realize the miniaturization of the apparatus.

In the above-described first embodiment, a resin bush 11 made of resin is interposed between the thus constructed yoke 50 and the first shaft 2.

If the resin bush 11 is thus interposed, since a clearance corresponding to the thickness of the resin bush 11 is generated, it is possible to further enhance the magnetic shielding property and it is possible to shorten a stop time of the clutch.

Also, since the resin bush 11 is interposed so that the first shaft 2 made of oil impregnated sintered alloy and the resin component (different kinds of material) are brought into sliding contact with each other unlike the conventional case where the components made of oil impregnated sintered material (same kind of material) are brought into sliding contact with each other, it is possible to enhance the sliding property. This is because, although there is a variation in service life of the oil film due to the variation in quantity and quality of the impregnated oil in the conventional same material contact, resulting in change in sliding service life, in the first embodiment, the sliding service life simply depends upon the wear of the resin.

Also, in the first embodiment, a thin plate of the yoke 50, located at the outermost position opposite the magnetically exciting coil 4, i.e., a part or portion of the outermost side thin plate is caused to extend radially outwardly to form the rotation preventing member 50a as the rotation preventing means (rotation prevention relative to the first shaft 2) that is brought into contact or engagement with a suitable member outside.

Thus, in order to provide the rotation preventing member 50a as the rotation preventing means, a part of a single thin plate to be laminated is caused to extend radially outwardly. In comparison with the conventional sintered alloy case where it is necessary to keep a thickness (length) in the axial direction to some extent in order to keep a sufficient mechanical strength, in case of the thin plate, it is possible to considerably reduce the thickness, and correspondingly, the length in the axial direction may be shortened.

Figure 7:
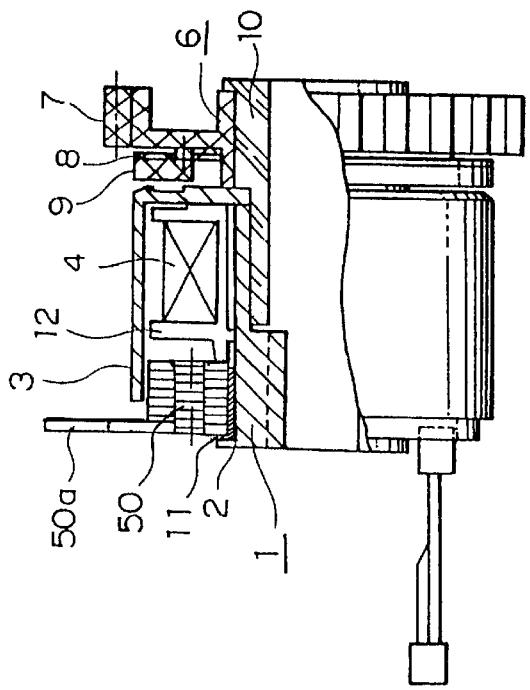
FIG. 7 is a fragmentary side elevational view showing a modified electromagnetic coupling apparatus in accordance with a first embodiment of the invention.

Also, in the above-described embodiment, it is preferable that the diameter of an outer diameter portion 50b of the yoke 50 which does not face an inner face of an outer circumferential portion 52 of the first rotary member 1 having a U-shape cross-section is smaller than the diameter of the outer diameter portion which faces the inner face of the outer circumferential portion (see FIG. 7). Also, it is possible that the thin plate which does not face the inner face of the outer circumferential portion 52 of the first rotary member 1 having the U-shaped cross-section is made of a different kind of material, for example, non-magnetic material, SUS.

As described above, the diameter of the outer diameter portion 50b of the yoke 50 is reduced or thin plate of the outer diameter portion 50b is formed from non-magnetic material which is different from the material of the other thin plates, it unlikely that the magnetic flux is applied to the portion of the outer diameter portion 50b which does not face the outer circumferential portion 52. It is therefore possible to reduce the force attracting the yoke 50 toward the magnetically exciting coil 4, thereby overcoming the conventional disadvantage.

Namely, in the conventional case, since the magnetic flux flies from the rotor 3 to the portion which does not face the outer circumferential portion 52 of the first rotary member 1, by the action of the magnetic balance maintenance between the yoke 5 and the rotor 3, the yoke 5 is forcibly attracted toward the magnetically exciting coil 4, the coil 4 is pushed to the side wall of the rotor 3, and the bobbin 12 which is the winding frame of the coil 4 is brought into frictional contact with the side wall of the rotor 3. As a result, the frictional wear amount of the end face of the bobbin 12 is increased or furthermore, the stick slip occurs between the bobbin 12 and the side wall of the rotor 3 due to the wear powder. The bobbin 12 is resonant to generate abnormal noise. However, these disadvantages may be overcome according to this embodiment.

Figure 9A:
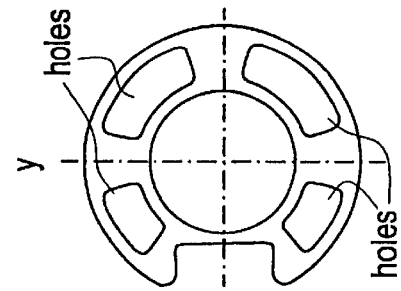
FIG. 9(a) shows a plan view of one example of a laminated plate that is formed by alternately stacking two thin plates each having a different hole pattern as illustrated in FIGS. 9(b) and 9(c)
Figure 9B:
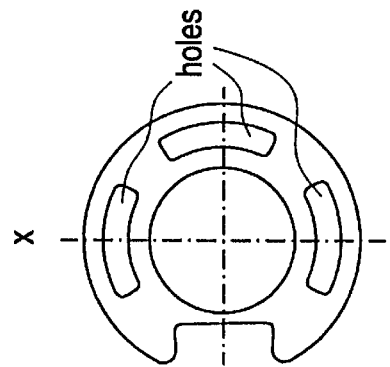
FIG. 9(b) shows a plan view of an example of the thin plate having a hole pattern as laminated in FIG. 9(a)
Figure 9C:
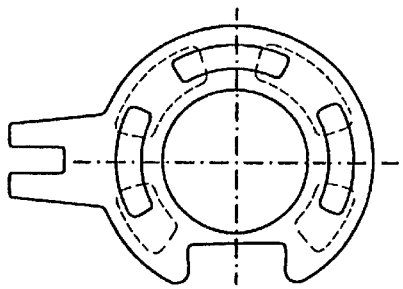
FIG. 9(c) shows a plan view of an example of the thin plate having another hole pattern as laminated in FIG. 9(a).

Also, in the above-described first embodiment, it is preferable to take a structure where the thin plates having at least two kinds of patterns are laminated for the form and arrangement of the holes as the structure where the holes of predetermined form and arrangement are provided in each of the thin plates to be laminated as the yoke 50 (see FIGS. 9(a)–(c)).

In the structure, thus, the holes each having the predetermined form and arrangement are provided in the thin plates to be laminated, and the thin plates where the form and arrangement of the holes are at least two kinds of patterns are laminated. In the conventional sintered alloy case or cold forging case, the through holes or blind holes are provided to reduce the weight of the yoke 5, which is very disadvantageous in the magnetic aspect. However, if the holes are formed while offsetting the form and position, it is possible to suppress the magnetic loss to a minimum level and to reduce the weight of the apparatus.

Incidentally, the reason why the holes having the different form and arrangement may readily be formed in each thin plate is that the yoke 50 is of the laminated structure of thin plates.

Also, in the above-described embodiment, it is preferable that when the resin bush 11 is to be arranged, the resin bush 11 is fixed to the inner circumferential surface (inner diameter side) of the yoke 50 by the insert molding method or the like. Also, to be described later in detail, it is possible to fix the bush in the circumferential direction as in the fifth embodiment.

As described above, the resin bush 11 is fixed to the yoke 50 to make it possible to avoid the sliding movement along the sliding surface on the radially inward side of the thin laminated plates whose surfaces are rough, and to further elongate the service of the resin bush 11. Accordingly, it is possible to provide an electromagnetic coupling apparatus that is low in manufacture cost, superior in magnetic shielding property, high in durability, compact in size and light in weight with high performance.

Incidentally, in the above-described first embodiment, a known plated steel plate is used as the thin plate to be laminated whereby it hardly rusts. Also, an electromagnetic steel plate is used as the thin plate to be laminated to make it possible to further enhance the magnetic characteristics in comparison with a regular steel plate and to make compact the apparatus while increasing the torque.

Embodiment 2

Figure 2:
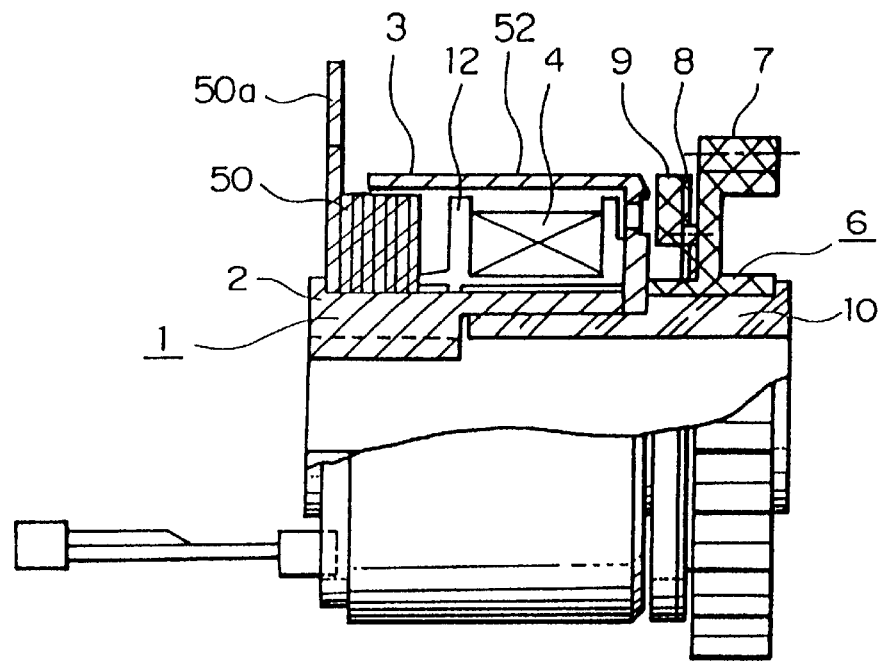
FIG. 2 is a fragmentary side elevational view showing an electromagnetic coupling apparatus in accordance with a second embodiment of the invention.

An electromagnetic coupling apparatus in accordance with a second embodiment of the present invention will now be described with reference to FIG. 2. FIG. 2 is a fragmentary side elevational view of the electromagnetic coupling apparatus.

In the same manner as in the first and the second embodiment of the present invention, the thin plates are laminated in the axial direction to form the yoke 50. The difference from the basic structure of the first embodiment is that a surface process is applied to the sliding portion between the yoke 50 and the first shaft 2.

The sliding portion means the sliding surfaces of the first shaft 2 and the yoke 50 and the circumferential surface of the first shaft 2 or the inner circumferential surface of the yoke 50.

The above-described surface process is a process for enhancing the wear-resistance property or the sliding property and may be performed by a suitable known means. In this case, it is possible to apply the surface process to only one or both of the circumferential surface of the first shaft 2 and thinner circumferential surface of the yoke 50.

According to the above-described second embodiment, it is possible to reduce the frictional coefficient between the yoke 50 and the first shaft 2 to enhance the sliding property and to smooth and stabilize the sliding movement between the yoke 50 and the first shaft 2 since the frictional coefficient is low. Thus, it is possible to reduce the loss torque.

Also, with respect to the yoke 50, it is troublesome to apply the surface process to only the sliding portion thereof. Accordingly, the yoke 50 as a whole may be dipped to perform the surface process over the entire surface of the yoke 50. In this case, it is also advantageous to ensure the rust-proof of the yoke 50.

Also, in comparison with the surface process in the case where the yoke 50 is the sintered part as in the conventional case, since the yoke 50 in accordance with this second embodiment is not the sintered part, it is possible to dispense with the special preprocess such as a sand blast process for clogging the pores. Accordingly, the manufacture cost may be reduced.

Thus, according to the second embodiment, it is possible to provide an electromagnetic coupling apparatus that is available for the anti-wear property and anti-abnormal noise and may keep the predetermined performance for a long period of time, to enhance the durability because the sliding property is better and is low in manufacture cost with a high performance.

Embodiment 3

Figure 3:
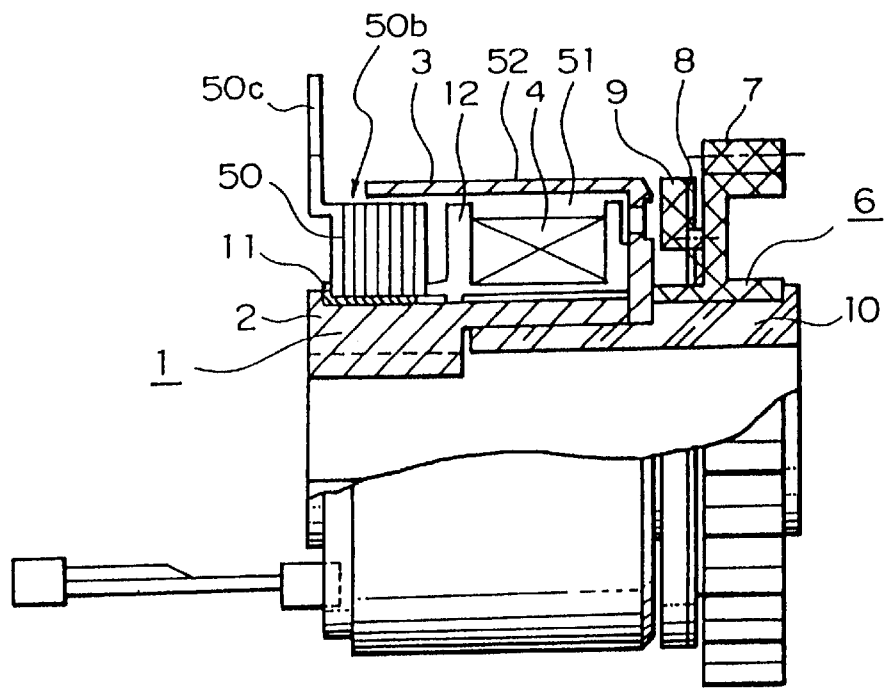
FIG. 3 is a fragmentary side elevational view showing an electromagnetic coupling apparatus in accordance with a third embodiment of the invention.

An electromagnetic coupling apparatus in accordance with a third embodiment of the present invention will now be described with reference to FIG. 3. FIG. 3 is a fragmentary side elevational view of the electromagnetic coupling apparatus.

In the same manner as in the first embodiment, in the third embodiment, the thin plates are laminated in the axial direction to form the yoke 50. The difference from the basic structure of the first embodiment is that a rotation preventing member 50c relative to the first shaft 2 of the yoke 50 is bent outwardly of the first rotary member 1.

Reference character 50c in FIG. 3 denotes the rotation preventing member of the yoke 50 having the shape bent outwardly of the first rotary member 1. The shown rotation preventing member 50c is formed by once slightly bending the outermost thin plate of the yoke 50 in the axial direction of the first shaft 2 and bending it so as to extend radially outwardly of the yoke 50.

According to the above-described third embodiment, it is unnecessary to dispose and extend the entire length of rotation preventing member in the axial direction of the first shaft 2 as in the conventional case but the position of the rotation preventing member 50c is set at a desired position simply by bending it slightly.

Accordingly, also, it is possible to readily move the position of the rotation preventing member 50c without changing the entire length in the axial direction of the first shaft 2, and at the same time, it is possible to provide the electromagnetic coupling apparatus that is light in weight while overcoming the disadvantage caused by the abnormal noise and wear.

Also, since the outer diameter portion 50b of the yoke 50 that does not face the outer circumferential wall 52 of the rotor 3 is reduced and may be made small in size, there is no fear that the outer diameter portion 50b would be attracted toward the magnetically exciting coil 4 due to the magnetic balance and it is possible to reduce the thrust load. Also, according to this, in comparison with the conventional case, it is possible to further eliminate the disadvantage caused by the abnormal noise and wear and furthermore it is possible to considerably reduce the weight.

Embodiment 4

Figure 4:
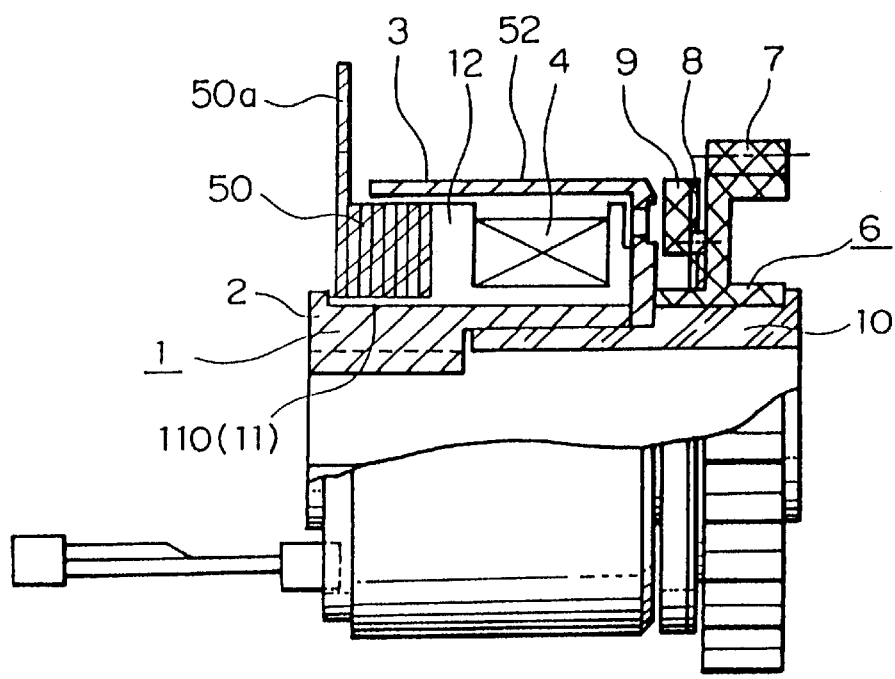
FIG. 4 is a fragmentary side elevational view showing an electromagnetic coupling apparatus in accordance with a fourth embodiment of the invention.

An electromagnetic coupling apparatus in accordance with a fourth embodiment of the present invention will now be described with reference to FIG. 4. FIG. 4 is a fragmentary side elevational view of the electromagnetic coupling apparatus.

In the same manner as in the first embodiment, in the fourth embodiment, the thin plates are laminated in the axial direction to form the yoke 50. The difference from the basic structure of the first embodiment is that the yoke 50 and the bobbin 12 that is the winding frame of the magnetically exciting coil 4 are formed integrally with each other.

In the fourth embodiment, as shown in FIG. 4, instead of the resin bush 11 (FIGS. 1 and 3) in the first embodiment, a part on the yoke 5 side of the bobbin 12 that is the winding frame made of resin is formed by an extension portion 110 extending between the first shaft 2 and the yoke 50 into a cylindrical form as in the above-described resin bush 11.

The fixture means between the yoke 5 and the resin bush 11 described in conjunction with the above-described first embodiment may be applied, without any modification, to the extension portion 110 that serves as the resin bush 11, i.e., the extension portion 110 that is substantially the same as the resin bush 11.

Thus, the yoke 50 and the winding frame (bobbin 12) are formed integrally with each other through the extension portion 110 that is used instead of the resin bush 11.

An example of this integration means will now be described with reference to FIG. 5.

Figure 5:
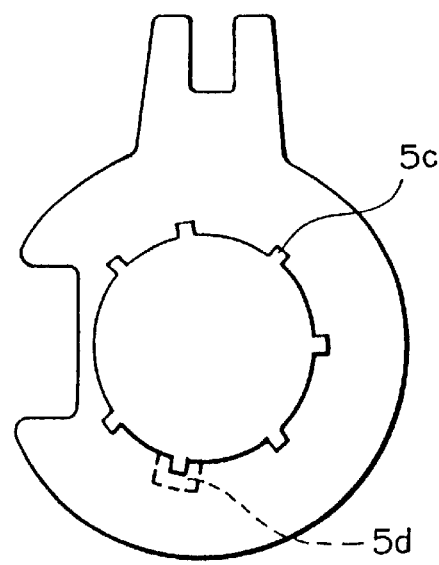
FIG. 5 is a side elevational view showing a yoke of an electromagnetic coupling apparatus in accordance with a fifth embodiment of the invention.

As shown in FIG. 5, at least one suitable cutaway 5c is provided along the axial direction of the first shaft 2 on the inner diameter side of the thin plate constituting the yoke 50. In this case, furthermore, it is preferable that the size of the cutaway 5c is somewhat increased only for several thin plates from the outermost thin plate as indicated by the dotted line 5d of FIG. 5.

The end portion of the rotation preventing rib (not shown) formed in the axial direction of the first shaft 2, for example, the rib portion on the outermost thin plate side of the yoke 50 is projected to the surface of the extension portion 110 that extends from the bobbin 12 that is the winding frame of the magnetically exciting coil 4 and is thermally deformed so that the yoke 50 and the extension portion 110 are formed integrally, that is, the yoke 50 and the winding frame (bobbin 12) are formed integrally through the above-described extension portion 110.

Incidentally, with respect to the integration means, as in the first embodiment, the resin bush 11 that is formed as a discrete member may be formed integrally with the winding frame (bobbin 12) by using a suitable known means such as adhesion or melt-bonding.

In accordance with the above-described fourth embodiment, the bobbin 12 that is the winding frame of the magnetically exciting coil 4 and the yoke 50 are formed integrally with each other so that not only may the integrated components be used as a single part (single component) but also the resin bush 11 that is the single part as in the first embodiment may be dispensed with. Accordingly, it is possible to reduce the number of the constituents and to omit the assembling work. The manufacture is simplified. It is possible to provide an electromagnetic coupling apparatus that is low in cost.

Embodiment 5

According to a fifth embodiment, in the first to fourth embodiments, as shown in FIG. 5, cutaways extending in the axial direction of the first shaft 2 are provided suitably on the inner diameter side (inner circumferential surface) of the yoke 5.

In the yoke 5 that is made of sintered alloy in the conventional case, if relatively small cutaways 5c are to be provided, it is impossible to keep the cutaway shape because of the fragility of the material. Accordingly, it is inevitable to provide large size cutaways. If the large size cutaways are formed, there is a disadvantage that the mechanical strength is lowered.

However, according to the present invention, since the thin plates are laminated to form the yoke 50, it is possible to readily form the small size cutaways by pressing work or the like.

If the cutaways 5c are thus formed in the yoke 50, in the first to fourth embodiments, in the electromagnetic coupling apparatus provided with the resin bush 11 or the extension portion 110 corresponding to the resin bush, it is possible to perform the function of the rotational prevention of the resin bush 11 or the extension portion 110 corresponding to the resin bush in the circumferential direction.

Also, in the same manner, in the electromagnetic coupling apparatus provided with the winding frame (bobbin 12) where the extension portion 110 is positioned on the inner diameter side of the yoke 50, it is possible to perform the function of the rotational prevention of the winding frame (bobbin 12) in the circumferential direction.

Furthermore, in the first to fourth embodiments, in the electromagnetic coupling apparatus where the inner diameter side of the yoke 50 is brought into direct contact with the first shaft 2, lubricant such as grease is filled in the cutaways 5c so that the cutaways 5c may serve as the lubricant reservoir. Without using the resin bush 11 or the extension portion 110 corresponding to this it is possible to considerably reduce the friction between the yoke 50 and the first shaft 2 and it is possible to maintain the smooth rotation and sliding property for a long period of time.

According to a first aspect to a sixteenth aspect of the invention, in any case, it is possible to provide an electromagnetic coupling apparatus in which the manufacture cost is low with superior durability and high performance.

Also, according to the first aspect and the second aspect of the invention, it is possible to provide a compact and high performance electromagnetic coupling apparatus in which the manufacture process is simplified, the manufacture cost is reduced because of the high productivity, and the magnetic characteristics is enhanced by reducing the magnetic resistance due to the increase of the density of the yoke.

Also, according to the third aspect of the present invention, its possible to further enhance the sliding property, to improve the magnetic shielding property and to shorten the stop time of the clutch.

Also, according to the fourth aspect of the present invention, the number of the mechanical parts may be reduced, the manufacture process is simplified and the manufacture cost is reduced. Furthermore, the assembling work is simplified and the manufacture cost is reduced.

Also, according to the fifth and the sixth aspect of the present invention, since the resin bush is formed integrally with the yoke to attain the sliding movement of the resin bush and the first shaft, in comparison with the conventional sliding movement of the same oil impregnated sintered alloy or the resin bush and the yoke, it is possible to enhance the sliding property and to maintain the service life of the resin bush for a long period of time to provide the electromagnetic coupling apparatus that is superior in durability.

Also, according to the seventh aspect of the present invention, it is possible to readily fix the resin bush to the yoke without fail.

Also, according to the eighth aspect of the present invention, it is possible to readily fix the resin bush to the yoke without fail, and furthermore, since the yoke, the resin bush and the winding frame of the magnetically exciting coil may be formed into one piece so that the latter may be handled as a single member, it is easy to assemble the apparatus and it is possible to reduce the manufacture cost.

Also, according to the ninth aspect of the present invention, since the attractive force of the yoke to the magnetically exciting coil is reduced to decrease the thrust load, and it is possible to avoid the disadvantage that the magnetically exciting coil is pushed toward the side wall of the rotor so that the winding frame (bobbin) of the magnetically exciting coil is brought into sliding contact with the side wall of the rotor to increase the frictional wear amount of the end face of the winding frame (bobbin) or the stick slip occurs between the winding frame (bobbin) and the side wall of the rotor due to the worn powder to resonate the winding frame (bobbin) or to generate the abnormal noise.

Also, according to the tenth aspect of the present invention, since the length of the rotation preventing member of the yoke to the first shaft may be shortened in the axial direction, it is possible to thin the yoke in the axial direction, to reduce the number of the mechanical parts and to reduce the manufacture cost.

Also, according to the eleventh aspect of the present invention, since it is possible to readily manufacture the thin plates by, for example, a pressing machine or the like, it is possible to considerably reduce the manufacture time per one yoke and to enhance the productivity.

Also, according to the twelfth aspect of the present invention, the surface process is applied whereby it is possible to considerably reduce the lost torque between the yoke and the first shaft without providing the resin bush and at the same time to exhibit the rust-proof effect to enhance the durability.

Furthermore, for the surface process, since the yoke is formed of thin plates such as steel plates rather than the sintered alloy as in the conventional case, it is possible to dispense with the troublesome preprocess and to reduce the manufacture cost.

Also, according to the thirteenth aspect of the present invention, it is possible to limit the magnetic loss to the minimum level without losing the facing area of the inner circumferential surface and the outer circumferential surface of the yoke, and at the same time to reduce the weight of the yoke and to make compact in size and light in weight the electromagnetic coupling apparatus.

Also, according to the fourteenth aspect of the present invention, since the attractive force of the yoke toward the coil is reduced so that the thrust load is reduced, it is possible to overcome the conventional disadvantage by the abnormal noise and wear. Furthermore, the part in question to be exposed outside is small so that the rust-proof effect is available.

Also, according to the fifteenth aspect of the invention, since the straight form is only available in the axial direction for the conventional rotation preventing member so that the entire length is inevitably elongated and the outer diameter of the portion that does not face the rotor of the yoke could not be reduced, according to the present invention, it is possible to form the outer diameter portion of the portion that does not face the rotor of the yoke may be reduced (made small in size). With such a compact formation, it is possible to reduce the attractive force of the yoke toward the coil and to reduce the weight of the yoke to reduce the thrust load. Thus, it is possible to overcome the disadvantage caused by the abnormal noise or wear.

Also, according to the sixteenth aspect of the invention, it is possible to reduce the loss torque between the yoke and the first shaft without providing the resin bush.

What is claimed is:

1. An electromagnetic coupling apparatus comprising:
    a first rotary member constituting a magnetic circuit and having an outer circumferential portion with a U-shaped cross section;
    a magnetically exciting coil provided to be relatively rotatable inside of said first rotary member;
    a yoke provided to be rotatable relative to said first rotary member for constituting a part of the magnetic circuit of said first rotary member; and
    a second rotary member provided to face said first rotary member in the axial direction and having a movable member provided to be movable in the axial direction for constituting a part of the magnetic circuit,
    wherein said yoke is formed by laminating thin plates in the axial direction, and
    corrugations are provided where adjacent thin plates are engaged with each other.

2. The electromagnetic coupling apparatus according to claim 1, wherein a resin bush is provided between said yoke and said first rotary member.

3. The electromagnetic coupling apparatus according to claim 2, wherein the resin bush and a winding frame of the magnetically exciting coil are formed integrally with each other.

4. The electromagnetic coupling apparatus according to claim 2, wherein the resin bush is fixed to said yoke.

5. The electromagnetic coupling apparatus according to claim 4, wherein an engagement convex portion is provided on an outer diameter side of the resin bush and an engagement concave portion engaged with said engagement convex portion is provided on an inner diameter side of the yoke.

6. The electromagnetic coupling apparatus according to claim 5, wherein the engagement convex portion is a rib formed on the outer diameter side of the resin bush and the engagement concave portion is a cutaway engaged with the rib of the resin bush and provided on the inner diameter side of the yoke.

7. The electromagnetic coupling apparatus according to claim 6, wherein the rib of the resin bush is thermally deformed at the cutaway portion of the yoke opposite the magnetically exciting coil to fix the yoke and the resin bush together, and said yoke and said magnetically exciting winding frame are formed integrally with each other through the resin bush.

8. The electromagnetic coupling apparatus according to claim 1, wherein a surface process for enhancing wear-resistance and sliding property is applied to a sliding portion of the yoke.

9. The electromagnetic coupling apparatus according to claim 1, wherein holes of a predetermined form and arrangement are provided in each thin plate, and the form and the arrangement of the holes are of at least two patterns.

10. The electromagnetic coupling apparatus according to claim 1, wherein each of the thin plates to be laminated to the portion that does not face the inner face of the outer circumferential portion of the first rotary member is made of non-magnetic material.

11. The electromagnetic coupling apparatus according to claim 1, wherein a cutaway is formed in the inner circumferential side of the yoke and lubricant is filled in the cutaway.

12. An electromagnetic coupling apparatus comprising:
    a first annular rotary member constituting a magnetic circuit and having an outer circumferential portion with a U-shaped cross section;
    a magnetically exciting annular coil provided to be relatively rotatable inside of said first rotary member;
    an annular yoke disposed on an opening end side of said first rotary member, provided to be rotatable relative to said first rotary member, for constituting a part of the magnetic circuit of said first rotary member; and
    a second rotary member provided to face said first rotary member in the axial direction and having a movable member provided to be movable in the axial direction for constituting a part of the magnetic circuit,
    wherein said yoke is formed by laminating annular thin plates, and corrugations are provided where adjacent thin plates are engaged with each other.

13. The electromagnetic coupling apparatus according to claim 12, wherein a diameter of an outer diameter portion of the yoke that does not face an inner face of the outer circumferential portion of said first rotary member is smaller than a diameter of the outer diameter portion of the yoke that faces the inner face of the outer circumferential portion of said first rotary member.

14. The electromagnetic coupling apparatus according to claim 12, wherein a part of the outermost thin plate of the yoke opposite the magnetically exciting coil extends radially and outwardly to serve as a rotation preventing member for preventing relative rotation with respect to the first rotary member.

15. The electromagnetic coupling apparatus according to claim 14, wherein the rotational preventing member for the first rotary member is formed by bending an outermost thin plate of the thin plates toward an outside of the first rotary member.

* * * * *